United States Patent [19]

Wiedemann

[11] Patent Number: 4,856,902
[45] Date of Patent: Aug. 15, 1989

[54] IMAGING AND INSPECTION APPARATUS AND METHOD

[75] Inventor: Rudolf A. Wiedemann, Sunnyvale, Calif.

[73] Assignee: Lasersense, Inc., Santa Clara, Calif.

[21] Appl. No.: 120,130

[22] Filed: Nov. 13, 1987

[51] Int. Cl.⁴ ............................................. G01B 11/00
[52] U.S. Cl. .................................................. 356/375
[58] Field of Search ..................... 356/375, 385, 384; 250/203 R

[56] References Cited

U.S. PATENT DOCUMENTS

| | | | |
|---|---|---|---|
| 3,435,232 | 3/1969 | Sorenson | 250/203 |
| 3,856,412 | 12/1974 | Zanoni | 356/167 |
| 3,879,131 | 4/1975 | Cuthbert et al. | 356/106 |
| 4,201,476 | 5/1980 | Musto | 356/160 |
| 4,272,190 | 6/1981 | Shapiro | 356/124 |
| 4,384,195 | 5/1983 | Nosler | 377/53 |
| 4,422,763 | 12/1983 | Kleinknecht | 356/356 |
| 4,427,296 | 1/1984 | Demarest et al. | 356/387 |
| 4,547,895 | 10/1985 | Mita et al. | 356/384 |
| 4,557,602 | 11/1986 | Maruo et al. | 356/375 |
| 4,583,854 | 4/1986 | Lozar | 356/237 |
| 4,597,668 | 7/1986 | Ono | 356/372 |
| 4,624,563 | 11/1986 | Johnson | 356/152 |
| 4,701,053 | 10/1987 | Ikenaga | 356/375 |
| 4,713,533 | 12/1987 | Bremer et al. | 350/203 R |
| 4,730,927 | 3/1988 | Ototake et al. | 356/375 |

Primary Examiner—Richard A. Rosenberger
Attorney, Agent, or Firm—A. C. Smith

[57] ABSTRACT

An improved method and apparatus for detecting the edges of a sample part operates on the Gaussian distribution of light intensity across a laser beam and uses analog signal and simple logical circuits to produce highly accurate, highly repeatable and rapid edge position indications. A multi-segment detector is configured with reference to the dimensions of the laser beam to provide independent outputs representative of relative position of the reflected or transmitted portion of the laser beam upon the detector as the edge of the sample part moves across the beam.

17 Claims, 6 Drawing Sheets

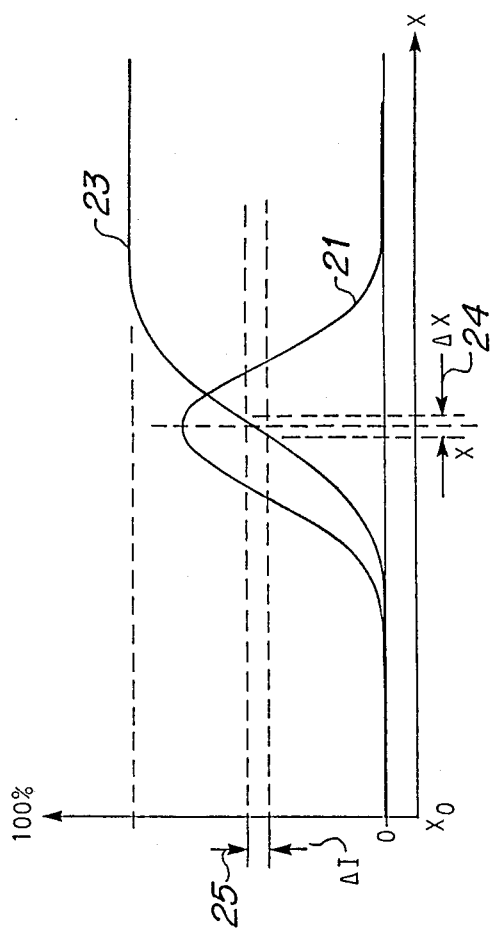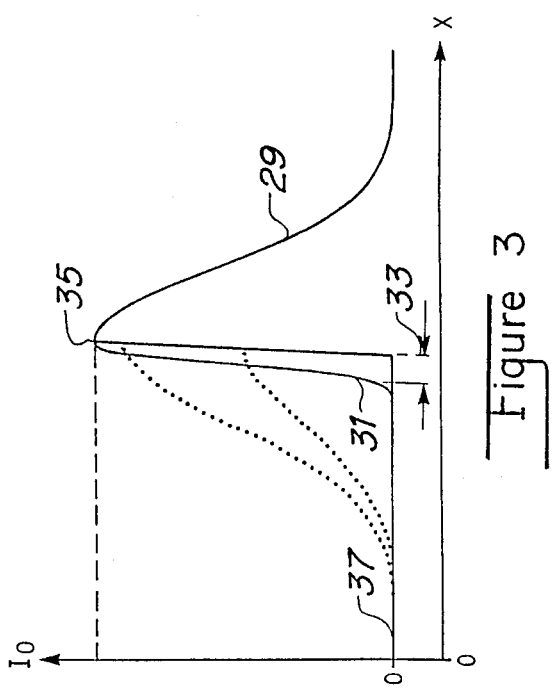

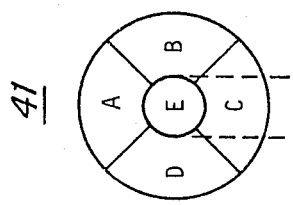
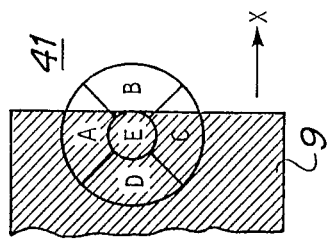
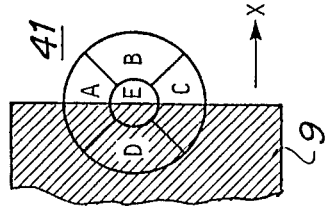
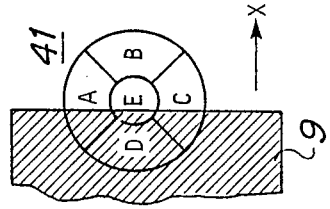
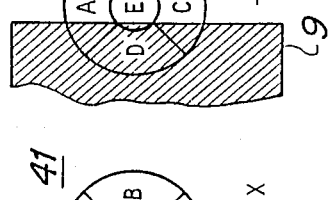
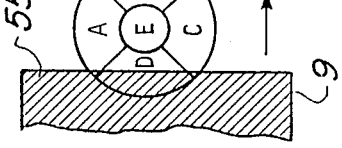

IMAGING AND INSPECTION APPARATUS AND METHOD

BACKGROUND OF THE INVENTION

1. Field of Invention

This invention relates to object inspection techniques, and more particularly to optical apparatus and method for detecting edges of parts or objects with high precision and repeatability.

One basis for measuring the dimensions of a part or object is finding suitable edges or surfaces accurately and repeatably. Many parts are contact-sensitive or moving too fast in automated handling for contact methods. For low-cost manual operations, this is usually accomplished with a microscope having calibrated cross-hairs in the eyepiece. The operator judges the location of the edges of the part and then aligns the cross-hairs with such edges in order to read the dimension. This labor-intensive process is subjective and susceptible to operator fatigue and variances.

Certain known automated measuring techniques use a video camera in conjunction with the microscope. An electronic "hairline" along with computer image enhancement assists the operator in the measurement process but usually cannot find the edges without operator assistance. Systems of this type having edge-finding capabilities typically cost over $50,000, are fairly slow, and usually are limited to use in the metrology laboratory rather than on the production floor where such capability is needed.

The current trend is toward integrating the design, manufacture and inspection of parts under fully automated control using Computer Aided Engineering (CAE), Computer Aided Design/Drafting (CADD), Computer Aided Manufacturing (CAM), and Computer Aided Inspection (CAI). Much progress has been made in all but the last area. Coordinate Measuring Machines (CMMs) are available which can automatically measure parts in an inspection laboratory environment, but because of their size and cost, such machines have not been effectively integrated into the manufacturing process. Measurements of this kind are almost exclusively done in the metrology laboratory in which the environment can be controlled, but which is usually remotely located with respect to the fabrication site.

Automated Optical Inspection (AOI) is a desirable "in-process" method of inspection in automated manufacturing that can remove the subjectivity of set-up and inspections during fabrication while allowing corrections of measurement parameters to be made immediately, resulting in more precise parts at higher yields in less time. Because AOI is an optical, non-contact technique, it removes many of the speed and part accessibility limits usually encountered in conventional measuring techniques and provides precision and accuracy previously unattainable, for example, with contact inspection techniques. Various optical, non-contacting measuring and inspection schemes are described in the literature (see, for example, U.S. Pat. Nos. 4,422,763; 4,384,195; 4,583,854; 3,879,131; 4,201,476; 3,856,412; 4,272,190; 4,597,668; 4,624,563; and 4,427,296).

Optical measurement techniques are ideally suited for high-speed, precision fabrication of metal parts, electronic assemblies, semiconductor components, and for numerous other manufacturing tasks such as alignment, inspection, tracking, and the like, within diverse segments of commerce. For example, measurement microscopes as described in the literature, are commonly used in the inspection or alignment of small and delicate parts. They are often equipped with "encoders" which precisely display the position of a part with respect to the cross-hairs seen through the eyepiece. A camera port is typically used to mount a video camera which aids the operator in the inspection process. Because these camera ports are well-standardized, any instrument with such a feature can support a variety of accessories, including an edge-finding accessory of the type later described herein. Also, in the electronics industry there are numerous measurement and alignment techniques employed at all stages of circuit chip and circuit board fabrication. Many of these techniques use video-based inspection equipment in which the accuracy is limited to the field of view of the microscope and camera combination. In addition, robotic arms used in production applications commonly reference an edge or measure where a sample edge is located. In one such application, a robotic arm may be controlled to lay down a bead of weld along a seam and in another application a robotic arm may be coordinated with a measuring machine to inspect parts for dimensional accuracy. These and other such applications usually require the ability to detect an edge from light reflected from the object rather than from light passed through the object.

SUMMARY OF THE INVENTION

In accordance with the present invention, an improved edge-detecting method and apparatus includes a laser for producing a specially-formatted beam, a microscope-type optical system, and a segmented detector for locating the edges of parts or objects with high precision and repeatability and without the interpolative error between data bits commonly associated with digital systems. The laser provides a very high concentration of light in a well-controlled zone for high inspection sensitivity. This zone is a constant percentage of the field of view, regardless of the power of the objective lens in the optical system. That is, the spot size of the beam in the field of view is not dependent upon objective magnification. This zone also provides a "smoothing" effect over rough edges when viewed at high magnification. The accuracy and resolution increases as the power of the objective increases and the area of the laser beam at the sample decreases. The laser beam exhibits peak power or intensity at its center which is utilized to provide maximum signal change as an edge under inspection crosses the center of the beam. Its single wavelength allows viewing of the part or object under ambient light which will not affect the precision of the edge detector. The detector according to the present invention includes a pattern of active elements which provide electrical signals that represent the portion of the beam reflected back through the optical system from the sample part. The pattern of active elements makes maximum use of the laser beam intensity profile for enhanced sensitivity to movement of reflective edges. Since the present invention spatially integrates the beam power over the dimensions of the beam, the the effects of rough edges and surfaces tend to be averaged or smoothed out. Analog electronics decode the detector signals into virtual digital "on/off" output when either a vertical or horizontal edge condition is detected that matches established signal limits. The detector and electronics can sense edges along X and Y axes independently and simultaneously. The analog circuitry is not computationally limited and permits edge detection in less than 1 microsecond for measurements "on-the-fly" at rates of movement of the sample parts of more than 1 meter/second. The method and apparatus of the present invention tolerates changes in distance from the objective lens to the sample part, but there are trade-offs between edge-finding resolution and depth-of-focus that depend upon the magnifying power of the objective lens. An "autofocus" system may be provided to maintain optimal working distance and to provide proximity measurement capability as well. As the contrast ratio between reflections received from sample parts and the background beyond the edge diminishes below limits, an indicator of insufficient contrasts is provided to advise the operator that measurement under these conditions may have poor measurement accuracy.

For sample parts on which surfaces and edges are either rounded, beveled or rough, such conditions can present problems if the geometry of the edge features are a large fraction of the radius of the laser beam. The operator is alerted that, for this type of edge, the magnifying power of the objective lens should be reduced in order to capture more of the edge within the beam zone (with slightly lower edge-finding resolution and repeatability). Of course, the spot size of the beam may be changed by conventional "zoom"-type optics. In the embodiment of the present invention, the beam location is fixed and the sample part is moved around under the measurement lens of the optical system. The edge positions thus accurately determined yield the distance or measurement between edges as a function of the translations of the supporting stage, and encoders coupled to the supporting stage provide the indication of the dimensions of a sample part between detected edges. Sample parts being sensed in sequence should, of course, be separated by at least one spot-size diameter for unambiguous detection. The present invention can thus form an integral part of an inspection system or process-control scheme in which the precise detection of an edge is essential.

DESCRIPTION OF THE DRAWINGS

FIG. 2 is a graph illustrating the Gaussian distribution of power or intensity across the diameter of the laser beam;

FIG. 3 is a graph illustrating the distribution of power of intensity of a laser beam reflected from near an edge or surface discontinuity;

FIGS. 4(a) and (b) are pictorial diagrams of the pattern of active segments in the embodiment of a detector according to the present invention;

FIGS. 5(a) through (e) are pictorial representations of the detector in spatial relationship to the edge of a insuing reflective part of object;

DESCRIPTION OF THE PREFERRED EMBODIMENT

Figure 1:
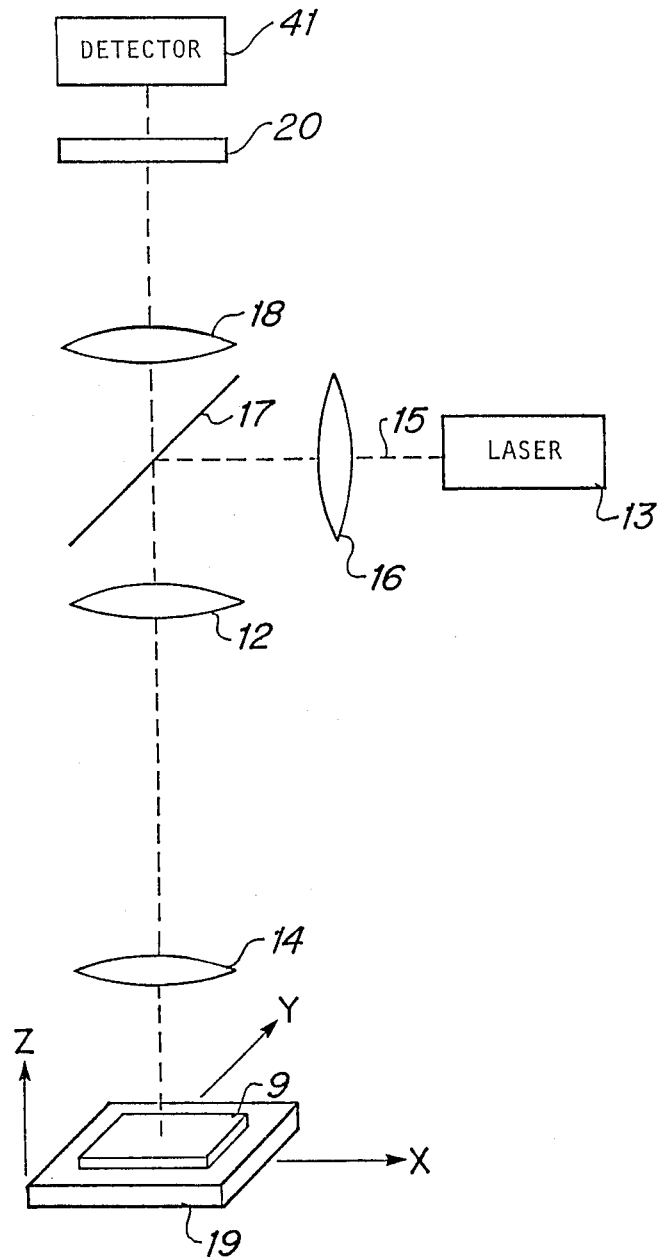
FIG. 1 is a pictorial diagram of the optical system according to one embodiment of the present invention.

Referring now to FIG. 1, there is shown a simplified pictorial diagram of an optical system according to one embodiment of the present invention in which the portion of a laser beam reflected from a sample part or object 9 is received by an optical sensor or detector 41. Specifically, a continuous-wave He Ne gas laser 13 is disposed to supply a laser beam 15 through a beam-formatting lens 16 to an optical beam splitter 17 (e.g., half-mirrored surface) for deflection through relay more lens 12 and objective lens 14 toward the sample 9 which is oriented to move on a supporting stage 19 for movement along orthogonally-oriented X and Y axes. Suitable encoders of conventional design (not shown) may be linked to the stage to indicate (electrically or mechanically) the movement of the stage 19 along respective axes in transversing the distances between sets of edges of the sample part 9. The refected beam from sample part 9 passes through the beam splitter 17 and imaging lens 18 and transmission filter 20 to the detector 41. The transmission filter 20 may be interposed to limit the transmission of light to only the wavelength of laser 13. The combination of the relay lens 12 and the formatting lens 16 provide constant spot size as a percentage of field given regardless of objective lens 14 magnification.

The beam 15 from laser 13 has a substantially Gaussian power density or intensity distribution with distance across the dimension thereof, as illustrated by the curve 21 of FIG. 2. It should be noted that this power density distribution is substantially symmetrical with a peak of intensity near the center of the curve. Also, it should be noted that the integral with distance of the power density distribution across the laser beam (illustrated by curve 23 on a different vertical scale in FIG. 2) has a maximum rate of change, or slope, at the center peak. This maximum rate of change of the integrated power density across the laser beam is utilized in the present invention to provide precision edge detection of a sample part within narrow limits 25 of electrical noise, switching delays, and the like, and with highest sensitivity to positional change across the center of the beam, and this translates to narrow limits of position error 24 within the central area of the laser beam 15. If such laser beam 15 is supplied to a sample part at an edge thereof, then the power density distribution across the beam (reflected or transmitted) on opposite sides of an edge of the part centered in the beam would appear as illustrated in FIG. 3. Specifically, the curve 29 of FIG. 3 illustrates the reflected or transmitted power density distribution across an edge (which is at least longer than the diameter of the beam), and illustrates the maximum differential intensity across the edge of the sample as an indication of the contrast ratios present across an edge. Where an edge of a sample part is rolled or rough or not straight, the graph of contrast ratio across the edge will not appear as a disfunctional curve 29 but rather will appear as a continuous curve with distinct upper and lower inflection points in a wider region of transition over X distance 33 from the peak intensity 35 to the reference level 37 of no reflection or no transmission. Thus, the differences between the power densities in a laser beam on opposite sides of an edge as the edge of the sample part moves through the beam establish high contrast ratios across the edge. It can be shown that the slope or rate of change of differences of power densities on opposite sides of an edge diminishes with diminished contrast ratio. A wide range of contrast ratios (i.e., wide range of edge conditions) can be tolerated during operation. The center of the beam is used to find the edge of the sample since most of the center region of the beam is in the region of highest slope of the integrated power density (curve 23 of FIG. 2), and the differences of power densities across the edge have the greatest slopes or rates of change where high contrast ratios are present across the edge.

To determine whether an edge condition has been met the detector differential signal is compared with a reference signal. This reference can be "captured" in a variety of conventional analog, digital or hybrid "sample and hold" circuits. An acceptance "window" can be devised as a percentage of the reference level such that if the signal received from the sample part falls between the window limits, the edge condition is assumed to have been met. Variances in absolute laser beam power, sample surface reflectance, and electrical noise, as well as depth of focus sensitivity, make a fixed reference subject to failure in finding edges because of small variances in a less-than-average sample edge for use as a 'reference' edge. These problems can be overcome, for example, by using a reference which follows the same effects that change the strength of the reflected signal. This can be considered as "self-referencing" of the sample edge to the laser beam, (i.e., normalization), which maintained the edge-condition limits as a constant percentage of a floating reference.

The laser beam is configured to exhibit substantially Gaussian power density or intensity distribution across its width, and this characteristic is used to advantage according to the present invention by employing a beam detector, as illustrated in FIG. 4(a), which includes several active segments that are patterned and dimensioned relative to the dimensions of the laser beam. Specifically, the detector 41 includes a central active segment E43 which has a diameter that is substantially equal to that diameter 51 of the laser beam at which the condition of substantially one-half the spatially-integrated power is satisfied. This one-half-power dimension on the power-density distribution profile 21 of a laser beam is illustrated in FIG. 5(a). The remaining active segments A44, B45, C47, and D49 are arranged concentrically about the center segment E43 and within the outer diameter 53 of the laser beam. Opposite pairs of peripheral segments (A-C, B-D) are oriented in alignment with the X and Y axes of movement of the sample part 9. Of course, these dimensions may be directly correlated or may be scaled up or down by suitable optical magnification. Where "out-of-focus" conditions exist, the power density distribution across the reflected beam may appear as illustrated in FIG. 4(b) where the diameter of the center segment E43 is less than the diameter of the laser beam at the half-power diameter thereof, as previously explained, and such condition will diminish edge sensitivity for reasons as later described herein.

As long as any one of the detector segments around the perimeter is fully illuminated before the edge condition is met, then the resulting signal level becomes a valid reference level. This will have an "in range to edge" level that is dependent upon the angle which the edge makes to the X or Y axis. With this scheme (using a single central segment), the difference between diametrically-opposed outer segment is used to lower or bias the signal from the central segment. This permits use of many well-known "zero crossing" techniques to determine when the edge condition is within given limits. For edges close to 45° from X or Y axes, 8 segments, around the perimeter rather than 4 can be used, and the largest differential between diametric opposite segments can be used as the reference in that case.

Figure 6:
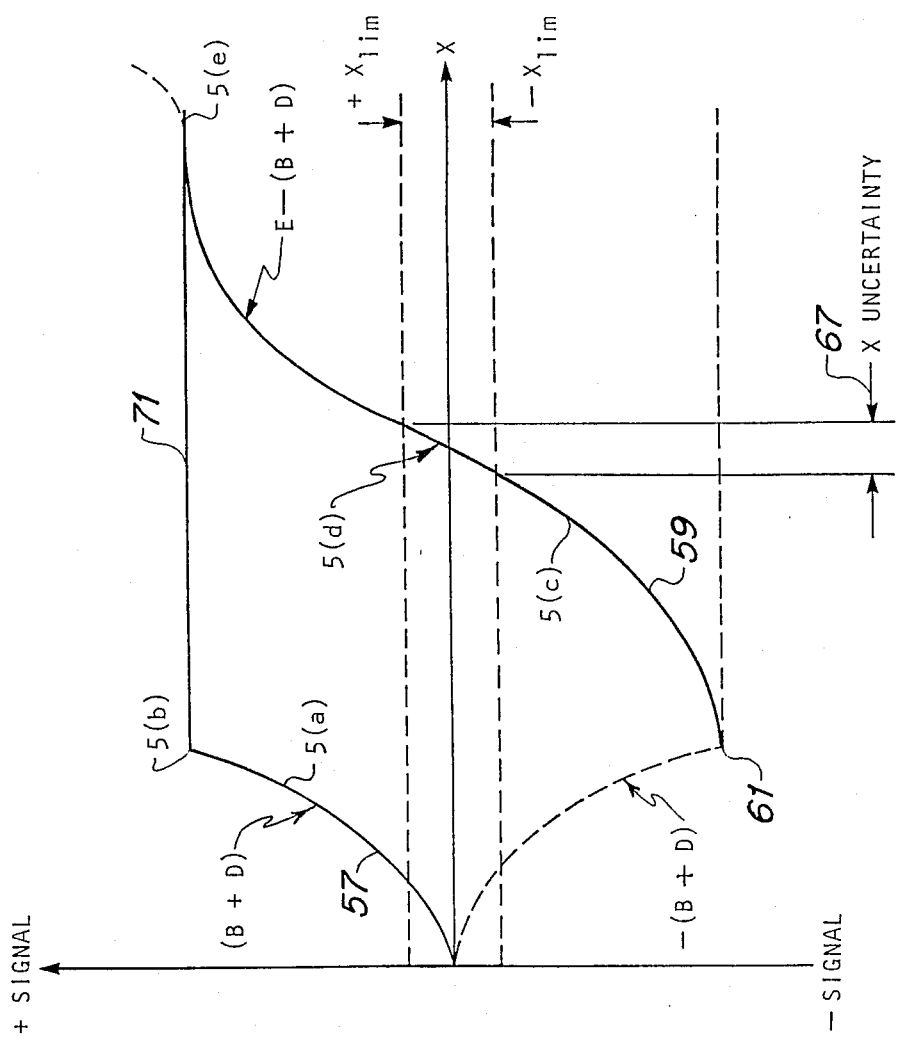
FIG. 6 is a graph illustrating the signal conditions attributable to the optical conditions illustrated in FIGS. 5(a) through (e)

In the preferred embodiment, the outer active segments A44, B45, C47, and D49 are oriented in quadrants around the center segment E43, and are angularly positioned so that opposite pairs of areas are substantially aligned with the orthogonal X and Y axes of relative movement of sample part and beam. Multi-segment detectors similar to detector 41 are described in the literature (see, for example, U.S. Pat. No. 3,435,232). Thus, as illustrated in FIGS. 5(a) through (e), a reflective sample part 9 supported on stage 19 to move along the X axis from left to right relative to the detector 41, causes left segment D49 to be illuminated initially as the right edge 55 of the sample part to be detected enters the field of view of the detector for reflections from the part 9. Of course, for transmission-mode of operation, the edge 55 to be detected may be considered to be the left edge of a part that is moving from left to right to expose the left segment D49 first. As the sample part 9 with edge 55 advances along the X axis, the illuminated area of active segment D (of conventional photoresponsive design) produces a signal that increases with distance traversed as more area of the active segment receives the reflected laser beam. The opposite-pair segment B aligned with segment D along the X axis will similarly produce increased output signal as its active area later receives the reflected laser beam. Thus, as illustrated by the curve 57 of FIG. 6, the summation of signals from segments B and D increases with distance moved by the part 9 along the X axis, until the entire active area of segment D is illuminated by the laser beam reflected from part 9, as shown in FIG. 5(b). Also, at about the position of part 9 illustrated in FIG. 5(b), central segment E begins to receive reflected laser beam to produce an output signal, as shown by curve 59 in FIG. 6. This signal may be combined with the inverse of the sum of signals from segment B and D to increase toward zero crossing from level 61. The signal gain, or weighting factor, for signal from segment E may be set at twice the gain for signals from segment A or B or C or D in order to establish the signal from exactly one-half of segment E under full illumination to be substantially equal to the signal from area D (or B) under full illumination. Alternatively, as previously described, the dimensions of the active segments may be selected such that the output of Central Segment E is 1/3 of the total beam power, or ½ of the combined output of A+B+C+D fully illuminated. Therefore, the combined signal of E−(B+D) illustrated by the curve 59 of FIG. 6 represents the integral (from level 61) of the reflected detected laser beam power with distance of the edge 55 moving across the area of segment E. When the edge 55 is centered on segment E, as illustrated in FIG. 5(d), the signal from segment E equals the inverse signal from segment D to provide a zero-level crossing at maximum rate of change (or slope) of signal with distance moved by the edge 55. Segment B may be sending background illumination which can reduce detectable contrast, so the contained signals from segments B+D is used as the reference condition along the X-axis direction. Suitable zero-crossing detection circuits of conventional design may be used to produce an output upon zero-crossing of the signal E−(B+D), within the narrow limits 63 of noise signals or selected limit signals about zero level, as an indication of the precise alignment of the edge 55 at the position of exact center of segment E, as shown in FIG. 5(d). (Some positional uncertainty 67 is associated with the combined signal represented by curve 59 crossing 'zero' level within the range of zero-level limits 63). As the edge 55 of part 9 moves beyond the center of segment E, as illustrated in FIG. 5(e), the combined signal (B+D) of curve 57 in FIG. 6 increases from level 71 as the segment B receives reflected laser beam and contributes signal that is combined with signal from segment D. The position detection of edge 55 is therefore substantially symmetrical, allowing the edge to be detected during movement from left to right, or from right to left, whether in reflective or transmissive mode. Additionally, it should be noted that the same analysis as described above with reference to movement of an edge along the X axis, applies for edges detected during movement along the Y axis from top to bottom, or from bottom to top in line with the orientation of segments A and C. Therefore, the same detector 41 may be used to detect left or right edges as well as upper and lower edges. Using a laser beam of 1 millimeter diameter and optical magnification of ten, and objective lens magnification of ten, positional sensitivity of approximately 1/10 to 1/20 of a spot diameter yields edge-detection sensitivity, according to the present invention of about 1 micron of movement.

Figure 7:
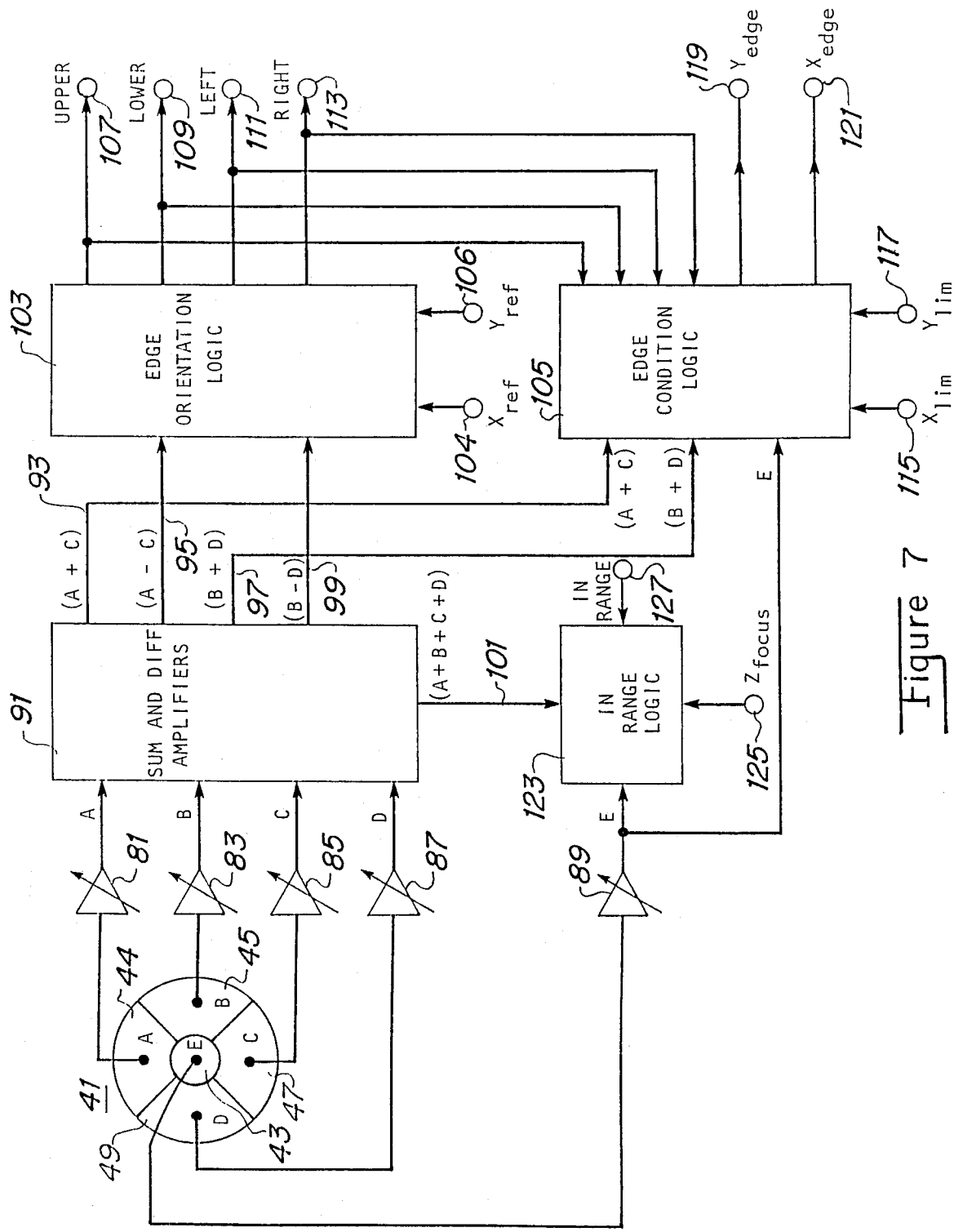
FIG. 7 is a block schematic diagram of the circuitry according to one embodiment of the invention for detecting the edge of the sample part.

Referring now to FIG. 7, there is shown a block schematic diagram of circuitry for operation according to the present invention. Amplifiers 81-89 are connected to receive the signals from the segments A-E, respectively, of the detector 41 and are set with equal gains amplifiers 81-87 and with twice such gain in amplifier 89 for reasons as previously discussed with reference to FIGS. 5 and 6. Alternatively, equal gains may be applied to signals derived from segments that are sized to integrate, in the central segment, twice the beam power of an outer segment when fully illuminated. The amplified signals are supplied to the inputs of the sum-and-difference amplifier 91 to yield the selected outputs (A+C) 93, (A−C) 95, (B+D) 97, (B−D) 99, and (A+B+C+D) 101. The outputs 95 and 99 are applied to the edge orientation logic circuit 103, and the outputs 93 and 97 are applied to the edge condition logic circuit 105. The edge orientatioin logic circuit receives X reference and Y reference signals 104, 106 and may include conventional analog logic circuitry for producing outputs 107, 109, 111, and 113 indicative of upper, lower, left, and right edges, respectively, according to the following logic conditions:

If $(B - D) \leq - X_{ref}$, then "Left" edge output 107 (eq. 1)

If $(B - D) \leq + X_{ref}$, then "Right" edge output 109 (eq. 2)

If $(A - C) \leq - Y_{ref}$, then "Lower" edge output 111 (eq. 3)

If $(A - C) \leq + Y_{ref}$, then "Upper" edge output 113 (eq. 4)

The edge condition logic 105 is connected to receive the outputs 107 - 113 from the edge orientation logic 103, and is also connected to receive X limit and Y limit input signals 115, 117, 93 (A+C), 97(B+D) and the amplified E-segment signal 89 to produce the X-edge and Y-edge outputs 119, 121 using conventional analog logic circuitry operating according to the following logic conditions:

$$\Delta X = E - (B + D) \qquad (eq. 5)$$

$$\Delta Y = E - (A + C) \qquad (eq. 6)$$

If $- X_{lim} \leq \Delta X \leq + X_{lim}$; then "X" edge output 121 (eq. 7)

If $- Y_{lim} \leq \Delta Y \leq + Y_{lim}$; then "Y" edge output 119 (eq. 8)

An in-range logic circuit 123 is connected to receive the amplified E-segment signal and a Z-focus input signal 125 and the summation output 101 from amplifier 91, and includes conventional analog logic circuitry operating to produce an in-range output 127 according to the following logic conditions:

$$Z_{focus} = \text{selected \% of } E \qquad (eq. 9)$$

If $[(A + B + C + D)/2] - E \leq Z_{focus}$, then (eq. 10)

in-range output 127

Figure 8:
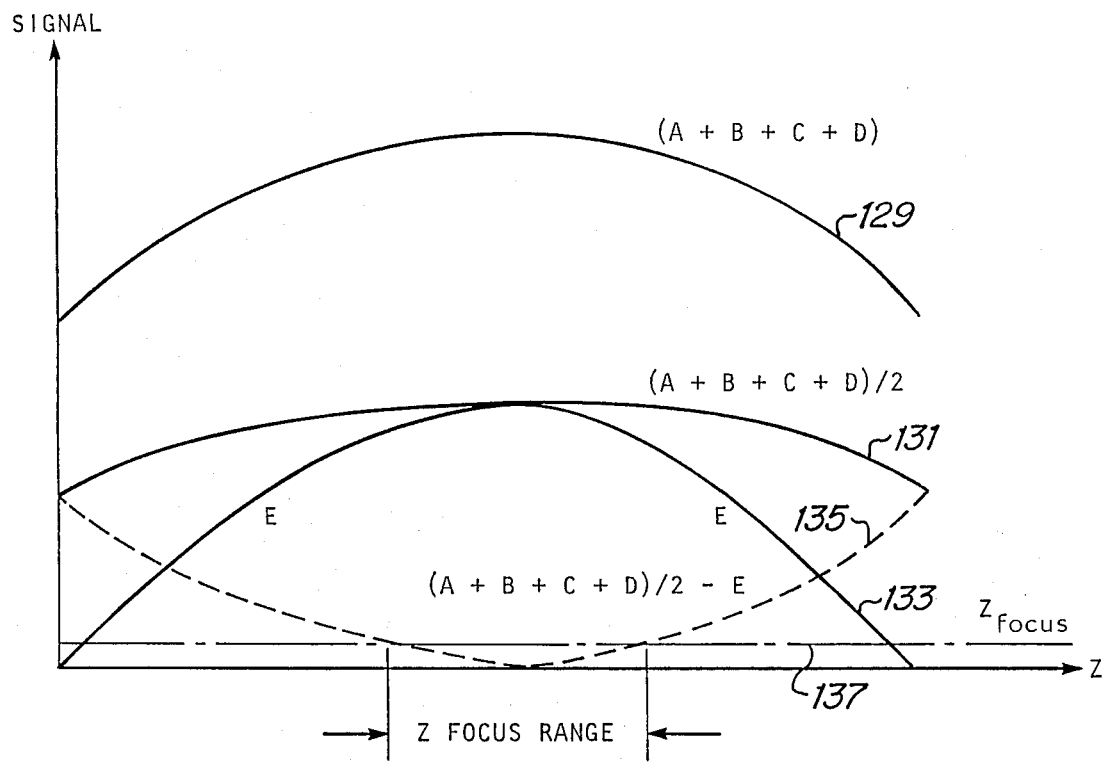
FIG. 8 is a graph illustrating the signal conditions in the operation of the circuitry of FIG. 7.

These operating conditions are illustrated in the graph of FIG. 8 which includes curve 129 that shows change in the level of summation signal 101 as the Z-axis distance between detector and source (or reflective part) varies. One-half the signal level of curve 129 is plotted as curve 131. Similarly, the values of E-segment signal 89 as a function of Z-axis spacing is plotted as curve 133. The curves 129, 131, and 133 exhibit peaks of amplitude in the central region as a result of the illumination pattern distributed over the areas of segments A through E of the detector, as illustrated in FIG. 4(b). Thus, from Equation 10 above, if one-half of the sum of A+B+C+D, plus the negative value of E (curve 135), is below the selected signal value of Z-focus 137, then the in-range signal 127 is produced to indicate that the optical system of FIG. 1 is properly positioned and focused relative to the sample part.

Therefore, the edge-detection system of the present invention relies upon the Gaussian distribution of light intensity or power density across a laser beam to provide accurate processing of analog signals indicative of the position of an edge of a sample part within the laser beam. Simple analog processing and logical analysis of signals from a multi-segment detector provide unambiguous indication of left or right, upper or lower edges of the sample part, with high positional accuracy as the part is moved through the laser beam aligned (either in reflective or transmissive mode) with the detector. High contrast ratios across the edge of the sample part provide greatest sensitivities to positional change across the laser beam to establish highly repeatable and highly accurate edge positional indications.

I claim:

1. The method of detecting the edge of an object interposed in the beam of a laser having Gaussian distribution of power density across the beam thereof, the method comprising the steps of:
   orienting the object for relative movement along an axis substantially orthogonal to the path of the beam for altering the beam propagation initially at the periphery thereof;
   detecting the relative intensities of the altered beam in at least four peripheral sectors oriented about a central sector with opposite pairs thereof disposed in substantial alignment with respective ones of orthogonal axes of relative movement of the object in a plane substantially orthogonal to the beam to produce representative outputs;

amplifying the outputs representative of the peripheral sectors of the beam with substantially the same selected gain and additively combining the amplified outputs to provide a composite signal;

amplifying the output representative of the central sector of the beam with substantially twice the selected gain;

subtracting one half the composite signal from the amplified output representative of the central sector of the beam to provide an output indication that varies as a function of the position of the object within the beam along the axis of movement; and comparing the composite signal with a reference to produce an output in response to the composite signal and the reference attaining a predetermined relationship, said output indicating the position of the edge of the object along the axis within the beam.

2. Object detection apparatus comprising:

laser means producing an output beam having Gaussian distribution of power density thereacross;

means supporting the object for relative movement along axes substantially orthogonal to the path of the beam for altering beam propagation initially at the periphery thereof;

detector means disposed to detect the relative intensities of the altered beam in at least four peripheral segments oriented about a central segment with opposite pairs of peripheral segments disposed in substantial alignment with respective one of said orthogonal axes of relative movement of the object, each of said segments producing said output indicative of the aggregate beam power detected thereby;

circuit means connected to amplify the outputs of the peripheral segments with a selected gain, and to amplify the output of the central segment with a gain substantially twice the selected gain;

means coupled to receive the amplified outputs from the segments of the detector means for subtracting one half of the summation of amplified outputs from the peripheral segments from the amplified output of the central segment for producing a composite signal that varies as a function of the position of the object within the beam along the axis of movement; and logic means coupled to receive the composite signal for producing an output therefrom in response to the composite signal attaining a predetermined relationship to a selected reference condition as an indication of the position of the edge of the object along the axis within the beam.

3. The method of detecting the edge of an object interposed in the beam of a laser having Gaussian distribution of power density across the beam thereof, the method comprising the steps of:

orienting the object for relative movement along an axis substantially orthogonal to the path of the beam for altering the beam propagation initially at the periphery thereof;

detecting substantially the entire beam power of the altered beam in the peripheral and central sectors to produce representative outputs;

selectively combining the representative outputs by summing the representative outputs of the peripheral sectors for subtraction from the representative output of the central sector to provide a composite signal that varies as a function of the position of the object within the beam along the axis of movement; and producing an output in response to change of the composite signal through zero value for indicating the position of the edge of the object along the axis within the beam.

4. The method of detecting the edge of an object interposed in the beam of a laser having Gaussian distribution of power density across the beam thereof, the method comprising the steps of:

orienting the object for relative movement along an axis substantially orthogonal to the path of the beam for altering the beam propagation initially at the periphery thereof;

detecting the portion of the altered beam in at least four peripheral sectors oriented about the central sector with opposite pairs of peripheral sectors disposed in substantial alignment with respective ones of orthogonal axes of relative movement of the object in a plane substantially normal to the beam for detecting substantially the entire beam power in the peripheral and central sectors of the beam to produce representative outputs therefrom;

selectively combining the outputs of the peripheral sectors and the output of the central sector to provide a composite signal that varies as a function of the position of the object within the beam along the axis of movement; and comparing the composite signal with a reference to produce an output in response to the composite signal and the reference attaining a predetermined relationship, said output indicating the position of the edge of the object along the axis within the beam.

5. The method according to claim 4 wherein in the step of selectively combining, the summation of representative outputs from the opposite pairs of peripheral sectors oriented along respective orthogonal axes are combined with the representative output from the central sector; and in the step of comparing, an output is produced representative of object position along each of the respective orthogonal axes in response to the change of the composite signal associated with such axis through zero value.

6. The method according to claim 4 wherein in the step of selectively combining, the outputs of the peripheral sectors of the detected beam are amplified with substantially the same selected gain and are additively combined, and the output of the central sector of the detected beam is amplified with substantially twice the selected gain, and one half the summation of all outputs of the peripheral sectors of the detected beam is subtracted from the amplified output of the central sector of the detected beam for comparison with a reference value to provide an output indication of operation within range of positions of the object along the beam.

7. The method of detecting the edge of an object interposed in the beam of a laser having Gaussian distribution of power density across the beam thereof, the method comprising the steps of:

orienting the object for relative movement along an axis substantially orthogonal to the path of the beam for altering the beam propagation initially at the periphery thereof;

detecting substantially the entire beam power in the peripheral and central sectors of the altered beam in at least a pair of peripheral sectors oriented about the central sector in substantial alignment with the axis of relative movement of the object to produce representative outputs therefrom;

selectively combining the outputs of the peripheral sectors and the output of the central sector to provide a composite signal that varies as a function of the position of the object within the beam along the axis of movement, said outputs representative of the pair of peripheral sectors of the beam being amplified with substantially the same selected gain and being additively combined, the output representative of the central sector of the beam being amplified with substantially twice the selected gain, and the additive combination of the amplified outputs of the peripheral sectors of the beam being subtracted therefrom to provide the composite signal; and comparing the composite signal with a reference to produce an output in response to the composite signal and the reference attaining a predetermined relationship, said output indicating the position of the edge of the object along the axis within the beam.

8. The method of detecting the edge of an object interposed in the beam of a laser having Gaussian distribution of power density across the beam thereof, the method comprising the steps of:

orienting the object for relative movement along an axis substantially orthogonal to the path of the beam for altering the beam propagation initially at the periphery thereof;

detecting the relative intensities of the altered beam in at least a pair of peripheral sectors oriented about a central sector in substantial alignment with the axis of relative movement of the object to produce representative outputs, said detected central sector of the beam being substantially equal to 1/3 of the total beam power and the beam power detected in each of the peripheral sectors being substantially equal to 1/2 of the beam power detected in the central sector;

selectively combining the outputs of the peripheral sectors and the output of the central sector to provide a composite signal that varies as a function of the position of the object within the beam along the axis of movement; and comparing the composite signal with a reference to produce an output in response to the composite signal and the reference attaining a predetermined relationship, said output indicating the position of the edge of the object along the axis within the beam.

9. The method according to claim 8 wherein the output is produced on conditions of maximum difference between the outputs of the pair of peripheral sectors that are aligned on opposite sides of the central sector along an axis, and the combined outputs of the peripheral sectors subtracted from the output from the central sector attains substantially zero value.

10. Object detection apparatus comprising:

laser means producing an output beam having a distribution of power density thereacross which is substantially centrally symmetrical and centrally peaked;

means supporting the object for relative movement along an axis substantially orthogonal to the path of the beam for altering beam propagation initially at the periphery thereof;

detector means having a central segment and at least a pair of peripheral segments aligned on opposite sides of the central segment along said axis, said detection means being disposed to detect the relative intensities of the altered beam in a plurality of said segments to produce outputs representative of the intensity of the altered beam detected by each such segment, each said segment producing said output indicative of the aggregate beam power detected thereby and substantially the entire beam power being detected in the peripheral and central segments;

circuit means connected to receive the outputs for selectively combining the outputs to provide a composite signal that varies as a function of the position of the object within the beam along the axis of movement; and logic means coupled to receive the composite signal for producing an output therefrom in response to the composite signal obtaining a predetermined relationship to a selected reference condition as an indication of the position of the edge of the object along the axis within the beam.

11. Object detection apparatus as in claim 10 wherein said circuit means and logic means subtract the summation of the outputs from the peripheral segments from the output from the central segment to produce an output in response to said composite signal attaining substantially zero value indicative of the position of the object within the beam.

12. Object detection apparatus as in claim 10 wherein said circuit means amplifies the outputs of each of the peripheral segments by a selected gain and amplifies the output of the central segment by a gain substantially twice said selected gain, said amplified outputs of the peripheral segments being additively combined and the additive combination being subtracted from the amplified output of the central segment to provide said composite signal which varies as a function of the position of the object within the beam; and said logic means produces said output in response to the composite signal attaining substantially zero value.

13. Object detection apparatus as in claim 10 wherein said central segment of the detector means is dimensioned to detect subsequentially 1/3 of the total beam power and each of the pair of peripheral segments is dimensioned to detect substantially 1/2 of the beam power detected by the central segment.

14. Object detection apparatus as in claim 13 wherein said logic means produces said output on conditions of maximum difference between the outputs of the pair of peripheral segments that are aligned on opposite sides of the central segment along an axis, and the combined outputs of the peripheral segments subtracted from the output from the central segment attain substantially zero value.

15. Object detection apparatus comprising:

laser means producing an output beam having a distribution of power density thereacross which is substantially centrally symmetrical and centrally peaked;

means supporting the object for relative movement along an axis substantially orthogonal to the path of the beam within a plane substantially orthogonal to the beam for altering beam propagation initially at the periphery thereof;

detector means having a substantially circular central segment and at least four peripheral continuous segments oriented around the central segment with opposite pairs of the peripheral segments disposed in substantial alignment with respective ones of said orthogonal axes of relative movement of the object, each of said segments producing said output indicative of the aggregate beam power detected thereby and substantially the entire beam power being detected in the peripheral and central segments;

circuit means connected to receive the outputs for selectively combining the outputs to provide a composite signal that varies as a function of the position of the object within the beam along the axis of movement; and logic means coupled to receive the composite signal for producing an output therefrom in response to the composite signal obtaining a predetermined relationship to a selected reference condition as an indication of the position of the edge of the object along the axis within the beam.

16. Object detection apparatus as in claim 15 wherein said circuit means and logic means subtract the sum of the outputs from opposite pairs of the peripheral segments oriented along respective orthogonal axes from the output from the central segment for producing an output for each axis in response to the composite signal of the central segment and opposite pair of peripheral segments aligned along such axis attaining a substantially zero value indicative of the position of the object within the beam along such axis.

17. Object detection apparatus as in claim 15 wherein said circuit means amplifies the outputs of the peripheral segments with a selected gain, and amplifies the output of the central segment with a gain substantially twice the selected gain; and means coupled to receive the amplified outputs from the segments of the detector means for subtracting one half of the summation of amplified outputs from peripheral segments from the amplified output of the central segment for producing from the comparison thereof with a reference value an output indicative of the position of the object along the axis of the beam.

* * * * *